C. M. HAYNES.
CLAMP FOR ADJUSTING SPECTACLE FRAMES.
APPLICATION FILED FEB. 11, 1920.
1,394,828.
Patented Oct. 25, 1921.
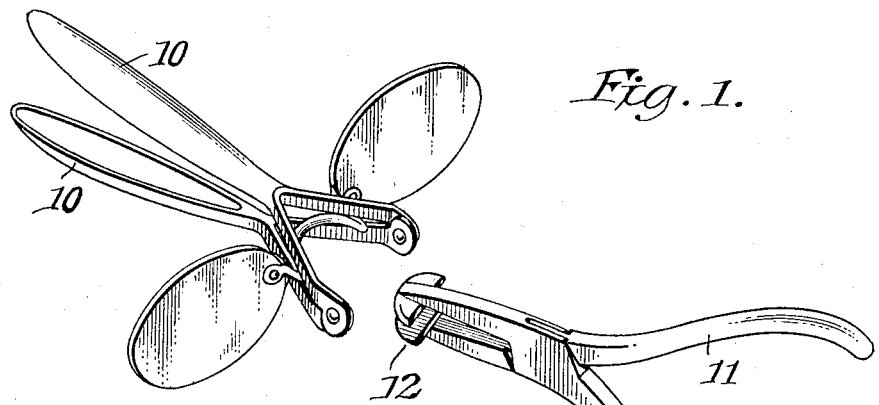
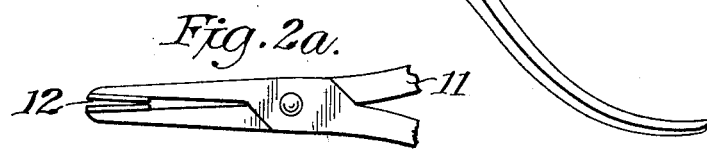
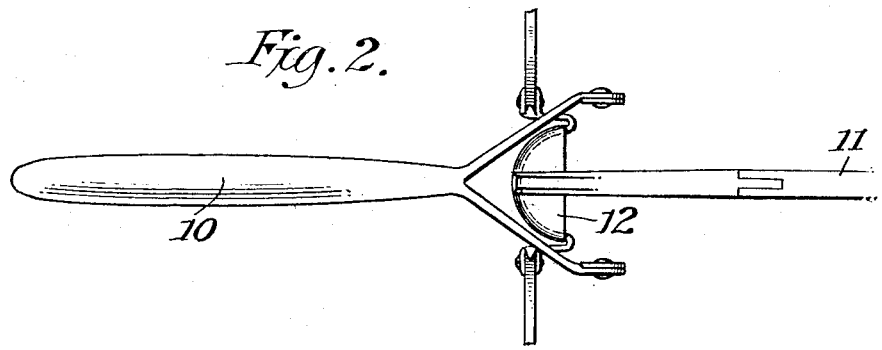
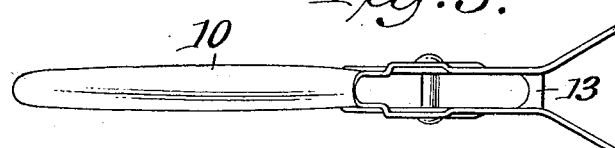
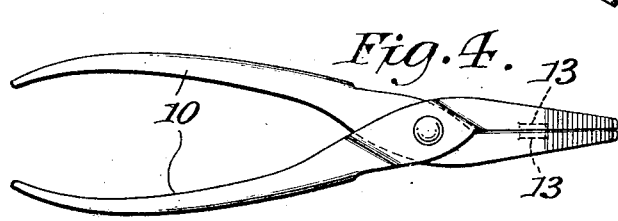
C. M. Haynes,
Inventor,
by Kerr, Page,
Cooper & Hayward,
ATTORNEYS.

UNITED STATES PATENT OFFICE.

CHARLES M. HAYNES, OF CHILLICOTHE, OHIO.

CLAMP FOR ADJUSTING SPECTACLE-FRAMES.

1,394,828.　　　　Specification of Letters Patent.　　Patented Oct. 25, 1921.

Application filed February 11, 1920. Serial No. 357,795.

*To all whom it may concern:*

Be it known that I, CHARLES M. HAYNES, a citizen of the United States of America, residing at Chillicothe, in the county of Ross and State of Ohio, have invented certain new and useful Improvements in Clamps for Adjusting Spectacle-Frames, of which the following is a full, clear, and exact description.

In fitting spectacles the optician frequently finds it necessary to bend the bridge of the mounting or frame for the purpose of raising or lowering the lenses in order to bring the optical centers thereof in correct position with respect to the pupils of the eyes. If the lenses are correctly alined and positioned with respect to each other they are certain to be disturbed in the bending of the bridge unless great care is exercised, and there is always danger of breaking a lens, especially when the mounting is of the so-called rimless type. I have therefore been led to devise my present invention, which has for its chief object to provide an instrument by the aid of which the desired bending of the bridge can be effected with the greatest ease and despatch, and without danger of breakage or of disturbing in any way the alinement of the lenses. To this and other ends the invention consists in the novel features hereinafter described.

In its preferred form the invention comprises a pair of handle-members, each forked at one end, which are fulcrumed or pivoted together at the inner or outer end of the fork, to form a pair of coöperating levers of the first or second class. These two members then constitute a manual clamp by which the end-portions of the bridge of the spectacle mounting can be held with the utmost firmness, permitting the bridge itself to be grasped by a pair of pliers or other instrument by which it can be bent easily and quickly to the required angle without imposing the slightest strain upon the lenses or upon any part of the frame outside of or beyond the clamp.

The embodiment thus outlined is illustrated in two forms in the accompanying drawing, in which—

Figure 1 is a perspective view illustrating, as used, a form of the invention in which the forked members are pivoted together at the outer extremity of the forks.

Fig. 2 is a plan view of the devices shown in Fig. 1, with the bridge grasped by a pair of pliers having jaws specially designed for adjusting or bending the bridge.

Fig. 2ª is a side view of the jaws of the pliers illustrated in Figs. 1 and 2, showing the angular divergence of the jaws when the latter are closed.

Fig. 3 is a plan view and Fig. 4 is a side view of another form of the invention, in which the forked members are pivoted together at a point adjacent to the inner end or apex of the forks instead of at the outer end.

My improved clamp is made preferably of brass or other relatively soft material so that the pressure on the bridge of the spectacle mounting will be less liable to mar the same, and it comprises two elongated members 10, which may be made by stamping and bending sheet metal of suitable gage. At one end both members are forked, as shown, and the two are arranged so that one fork exactly overlies or registers with the other. It will be observed that each forked prong is blade-like in form and when clasping the bridge contacts it approximately in a point whereas the width of each prong gives it rigidity in the line of pressure. In the form shown in Figs. 1 and 2 the two members are pivoted together at the outer ends of the forks, thus making them levers of the second order.

In use the clamp is slipped rearwardly over the bridge, as clearly indicated in Figs. 1 and 2, and is held in one hand, gripping firmly the bridge at any desired points adjacent to the lenses. The forks are thin, as stated above, and hence can be seated in narrow spaces between the bridge and the lenses, as shown in Figs. 1 and 2, but at the same time their width in the line of pressure gives them the rigidity required to hold the parts with great firmness. The same is true of the embodiment illustrated in Figs. 3 and 4, described below. The bridge projecting between the forks is then grasped by means of pliers or other suitable instrument as indicated in Fig. 2, and is bent up or down without the slightest danger of breaking a lens or disturbing the alinement. The pliers shown at 11, Figs. 1 and 2, are specially adapted for the purpose, having broad jaw pieces 12 by which the bridge can be gripped at both sides, as near to the clamp jaws as desired. Most bridges are slightly thicker at the center than at its ends, and in order to give the pliers a firmer grip the jaw-pieces 12 can be arranged at a slight angle to each other, as shown in Fig. 2ª.

In the clamp shown in Figs. 3 and 4 the two members 10 are each made of a single piece of sheet metal bent to the proper shape and in each the forks are connected at their apex by a stay 13 integral therewith. The two members are pivoted together in rear of the forks, thus forming two levers of the first order. This gives slightly less leverage in a device of the same length than is afforded by pivoting the parts at the ends of the forks, as in Fig. 1, but there is ample leverage for the purpose desired.

It is to be understood that the invention is not limited to the specific forms herein illustrated and described but can be embodied in other constructions without departing from its spirit.

I claim:

1. A clamp for the purpose described, comprising a pair of manually actuated members each having at an end a forked clamping jaw composed of laterally thin prongs rigid in the line of pressure, said members being pivoted together with the thin edges of the forks coöperating in the same planes, to grip and hold rigidly between such thin edges a spectacle frame at points between the bridge and the lenses, leaving the bridge itself exposed for bending or other adjustment.

2. A clamp for the purpose described, comprising a pair of pivoted manually actuated members having clamping jaws composed of angularly spaced laterally thin blade-like prongs adapted to coöperate with each other to grip and hold rigidly between the thin edges of one and the thin edges of the other the bridge of a spectacle frame at points near the ends thereof, leaving the intermediate bowed portion of the bridge exposed for bending or other adjustment.

3. A clamp for the purpose described comprising a pair of manually actuated members each having at an end a forked clamping jaw composed of laterally thin prongs rigid in the line of pressure, said members being pivoted together at the ends of the prongs with the thin edges of the prongs coöperating to grip and hold rigidly between such thin edges a spectacle frame at points between the bridge and the lens, leaving the bridge itself exposed for bending or other adjustment.

4. A clamp for the purpose described comprising a pair of members pivoted together at their ends to form levers of the second class, said members including forked clamping jaws having blade-like prongs adapted to coöperate with each other to grip and hold rigidly between the thin edges of one and the thin edges of the other the bridge of a spectacle frame at points near the ends thereof leaving the intermediate bowed portion of the bridge exposed for bending or other adjustment.

In testimony whereof I hereunto affix my signature.

CHARLES M. HAYNES.